United States Patent
Dobner et al.

(10) Patent No.: US 6,698,990 B1
(45) Date of Patent: Mar. 2, 2004

(54) LOADING AND UNLOADING INSTALLATION FOR GENERAL CARGO, ESPECIALLY FOR ISO CONTAINERS

(75) Inventors: Mathias Dobner, Rommerskirchen (DE); Hermann Franzen, Mönchengladbach (DE); Joachim Kröll, Jüchen (DE)

(73) Assignee: Gottwald Port Technology GmbH, Düsseldorf (DE)

( * ) Notice: Subject to any disclaimer, the term of this patent is extended or adjusted under 35 U.S.C. 154(b) by 0 days.

(21) Appl. No.: 09/979,346

(22) PCT Filed: May 11, 2000

(86) PCT No.: PCT/DE00/01524
§ 371 (c)(1),
(2), (4) Date: Nov. 20, 2001

(87) PCT Pub. No.: WO00/71452
PCT Pub. Date: Nov. 30, 2000

(30) Foreign Application Priority Data

May 20, 1999 (DE) ......................... 199 23 813

(51) Int. Cl.[7] ............................................. B65G 63/00
(52) U.S. Cl. ................... 414/139.9; 414/140.3
(58) Field of Search .................... 414/139.4, 139.9, 414/140.3, 141.3

(56) References Cited

U.S. PATENT DOCUMENTS

| | | | | |
|---|---|---|---|---|
| 3,559,822 A | * | 2/1971 | Lichtenford | 214/14 |
| 3,727,776 A | * | 4/1973 | Meeusen | 214/14 |
| 3,836,020 A | * | 9/1974 | Lassig | 214/16.6 |
| 3,952,891 A | * | 4/1976 | Terayama et al. | 214/152 |
| 4,293,077 A | | 10/1981 | Makino | |
| 4,820,101 A | * | 4/1989 | Fenn | 414/21 |
| 5,421,688 A | * | 6/1995 | Fuchtey et al. | 414/392 |
| 5,511,923 A | * | 4/1996 | Dunstan | 414/139.9 |
| 5,540,532 A | * | 7/1996 | Carder et al. | 414/284 |
| 5,618,148 A | * | 4/1997 | Iversen et al. | 414/139.9 |
| 5,707,199 A | * | 1/1998 | Faller | 414/239 |
| 5,876,172 A | * | 3/1999 | Di Rosa | 414/139.9 |
| 5,882,164 A | * | 3/1999 | Rapeli et al. | 414/141.3 |
| 5,951,226 A | * | 9/1999 | Fantuzzi | 414/141.3 |

FOREIGN PATENT DOCUMENTS

| | | |
|---|---|---|
| DE | 26 22 698 | 5/1976 |
| DE | 26 29 718 | 7/1976 |
| DE | 44 39 740 | 10/1994 |
| EP | 0 768 256 | 10/1996 |
| NL | 93 02 101 | 12/1993 |

* cited by examiner

*Primary Examiner*—Thomas J. Brahan
(74) *Attorney, Agent, or Firm*—Cohen, Pontani, Lieberman & Pavane

(57) ABSTRACT

A transfer installation for piece goods, in particular for ISO containers, including a warehouse having individual linear storage modules, and including at least one loading installation which can be displaced transversely to the storage modules and is intended for land-going means of transport, between which a storage and retrieval unit assigned to each storage module operates. The loading installation includes at least two ground-level leading stations for means of transport, to each of which is assigned one intermediate buffer store which is arranged on the second level, located above the means of transport, and has at least one storage location from which the respective means of transport can be manually loaded/unloaded by means of an associated loading crane. The intermediate buffer stores are connected to one another via a transfer transporter and one of the intermediate buffer stores is connected to the warehouse via the storage and retrieval unit.

22 Claims, 9 Drawing Sheets

LOADING AND UNLOADING INSTALLATION FOR GENERAL CARGO, ESPECIALLY FOR ISO CONTAINERS

Background of the Invention

1. Field of the Invention

The invention relates to a transfer installation for piece goods, in particular for ISO containers, including a warehouse having individual linear storage modules and a loading installation which extends transversely of the storage modules and is intended for land-going means of transport.

2. Description of the Related Arts

For transferring ISO containers between different means of transport, for example ships, railroad vehicles or trucks, use is made of loading installations which have to ensure as far as possible disruption-free piece-goods transfer with high throughputs. The essential constituent part of a container-transfer installation is usually a warehouse which isolates the piece-goods streams and thus ensures that the various means of transport are served as required. Serving the various means of transport as required with the correct quantities requires the design of the overall transfer installation to be optimized in terms of piece-goods streams.

DE 44 39 740 C1 discloses a transfer installation of the generic type for ships, railroad vehicles and trucks. The essential constituent part of this transfer installation is a container warehouse. The container warehouse comprises a plurality of individual line-like storage modules in which use is made of in each case one storage crane for storage and retrieval purposes. Operating between the ship and warehouse are container bridges which are connected to the warehouse via transporting pallets moving on carriageways. Transfer also takes place to land-going means of transport, such as trucks and railroad vehicles. Whereas the sea-based transfer process between ship and warehouse is large automated and, accordingly, can be made to take place rapidly, for adaptation thereto, i.e. for ensuring a piece-goods flow which is uniform overall, the transfer between warehouse and the land-based, land-going means of transport can only be effected with increased outlay on the part of the loading installations used here. A reason for this is that this transfer process, on account of the manually maneuvered land-going means of transport, can only be automated to a limited extent. On account of the as far as possible manual transfer process, it is necessary to observe relevant safety guidelines (for example to prevent collision and falling of the loads), which conflict with the transfer operation being carried out as rapidly as possible.

SUMMARY OF THE INVENTION

The object of the present invention is thus to provide a loading installation for land-going means of transport within a transfer installation which, with safety regulations being observed, ensures rapid transfer with minimal outlay on the part of the loading installations.

The invention includes the technical teaching that a loading installation for land-going means of transport comprises at least two ground-level loading stations for means of transport, to which is assigned in each case one intermediate buffer store which is arranged on the second level, located above the means of transport, and has at least one storage location. From the intermediate buffer store, the respectively associated means of transport is loaded/unloaded via corresponding loading cranes. The intermediate buffer stores are connected to one another and at least one of the two buffer stores is connected to the warehouse via a storage and retrieval unit.

The in to this extent multi-level loading installation allows flexible transfer to various land-going means of transport without separate loading installations being necessary, for example for railroad vehicles and trucks. This reduces the outlay on the part of the loading installation. By virtue of the intermediate buffer stores, which are arranged on the second level and are connected to one another, the arrival rate and service rate of the piece goods which are to be transferred are isolated from one another, with the result that rapid transfer is ensured. The multi-level structural arrangement of the loading installation makes it easier to observe the relevant safety regulations since loading regions and traveling regions for the manual means of transport are precisely demarcated.

The storage and retrieval unit is advantageously arranged in relation to the loading installation such that, bypassing an intermediate buffer store provided as the interface with the warehouse, the storage and retrieval unit, functioning directly as a loading crane, can serve a loading station, preferably for trucks. This measure makes it possible to achieve rapid transfer since the other means of transport and storage integrated in the loading installation are not utilized.

It is advantageous if the transfer transporter used for connecting the intermediate buffer stores to one another is a fully automatic gantry crane which is arranged on a bridge on a third level, located above the intermediate buffer stores, of the loading installation. This arrangement makes it possible for piece goods to be transported between the intermediate buffer stores by a means of transport which is of straightforward configuration and is integrated in the loading installation. In addition to the transfer transporter configured as a gantry crane, it is possible to use a low-level rail-borne satellite carrier vehicle which interacts with the gantry crane and, for transporting the piece goods, is provided with lifting equipment.

A further invention-improving measure for ensuring low-disruption operation consists in providing a service vehicle which is arranged on the third level of the loading installation and by means of which the storage and retrieval unit can be transferred from one storage module to a further, parallel storage module or can be transported to a service station. The service vehicle makes it possible, for example, to transport the defective storage and retrieval unit to a service station in the event of disruption and to replace it by an unused storage and retrieval unit instead to continue operation. The service vehicle thus allows flexible use of storage and retrieval units. The service vehicle is preferably of crane-like design in the manner of an angled crab which has two parallel carrying arms with end load-bearing means which interact with corresponding points of attachment on the storage and retrieval unit. Alternatively, it is also possible for the service vehicle, as a bridge vehicle, to comprise a shuttle which runs on a bridge with railways and can be coupled to the storage and retrieval unit. In this case, the railway of the bridge is located on the same level as a railway of the storage and retrieval unit, with the result that the two railways can be coupled. The shuttle is advantageously battery-operated and can be charged in a parking position on the bridge. Furthermore, a diesel-electric drive is also conceivable.

A further invention-improving measure resides in the fact that the loading and unloading station for trucks is arranged relative to the associated intermediate buffer store, which is located on the level located above the trucks, such that the safety-critical region above the driver's cab of the truck is located directly beneath the intermediate buffer store and thus outside the loading region. A falling load thus cannot pose a threat to the driver's cab of the truck since it is moved outside this safety-critical region. For executing the loading operation for a truck manually, it is possible to provide a checker's cab which is arranged beneath that end region of the intermediate buffer store which is directed toward the loading station. In order to ensure an unobstructed view of the loading crane and truck, the checker's cab can advantageously be displaced horizontally, transversely to the storage modules. It is also operationally possible for the loading operation to be transmitted, by monitoring cameras, to a control center and controlled remotely from there.

A further invention-improving measure which may optionally be provided resides in the fact that an additional gantry crane is provided, as transfer transporter, to follow the railroad-based intermediate buffer store, and beneath the loading crane, and has a railway which is arranged on the same level as the railway of the intermediate buffer store and can be coupled to the same. It is likewise possible to arrange a further intermediate buffer store at that end of the additional gantry crane which is located opposite the railroad-based intermediate buffer store. These measures may be taken as appropriate, depending on the necessary transfer parameters, in order to optimize the piece-goods transfer.

DETAILED DESCRIPTION OF THE PRESENTLY PREFERRED EMBODIMENTS

Figure 1:
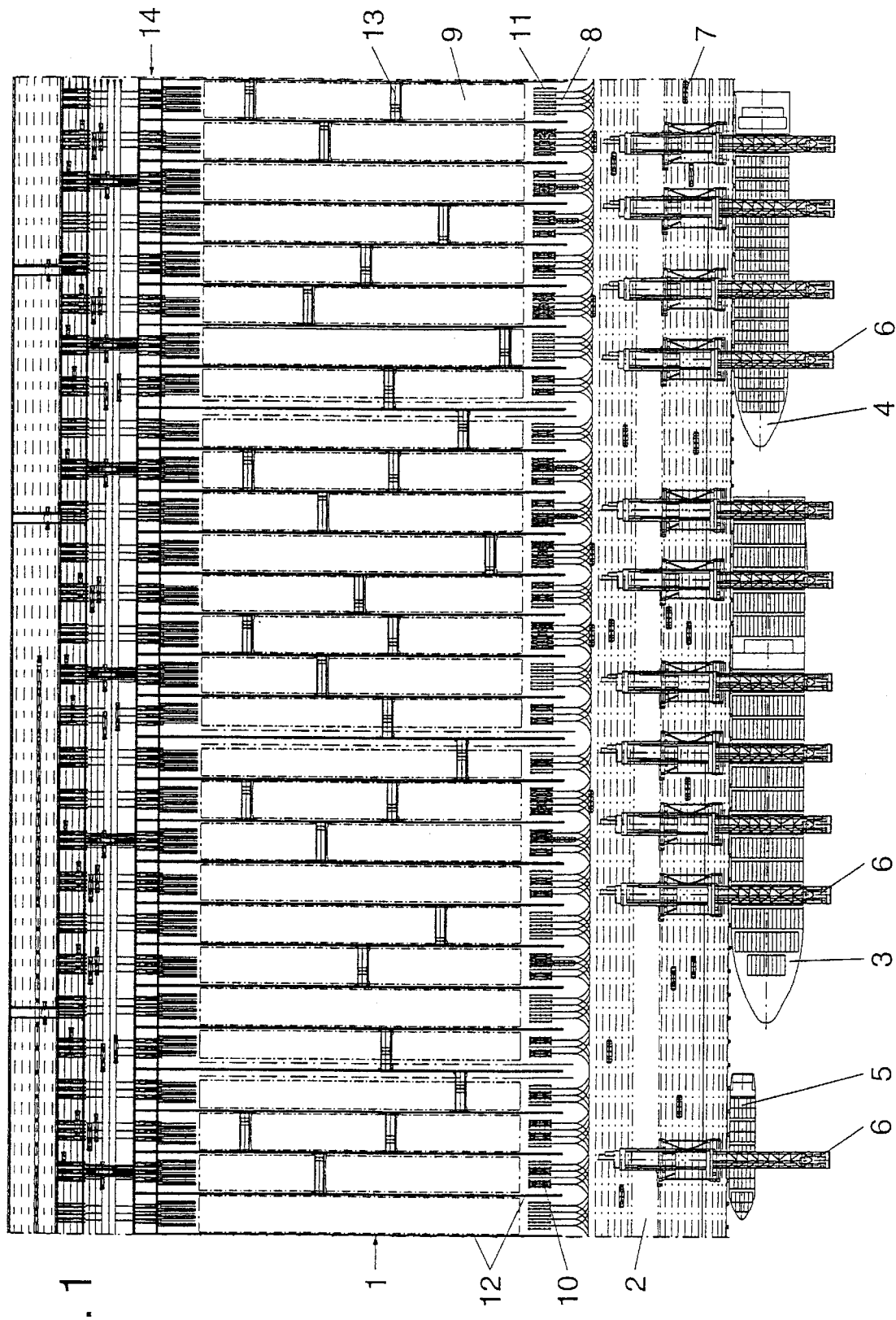
FIG. 1 shows a plan view of a transfer installation for transfer to or from ships, railroad vehicles and trucks.

A fully automatic warehouse 1 according to figure 1 is arranged along a quay 2, along which ships 3, 4, 5 of different sizes are located. Container bridges 6 operate parallel to the ships 3, 4, 5. During the unloading operation, the container bridges 6 transport containers 10 as piece goods to driverless transporting vehicles (DTV) 7. Activated and assisted via corresponding loading and storage control means, the DTVs 7 navigate to a transfer location 8 in the warehouse 9 and, there, transfer the container 10 to a stationary four-aisle intermediate buffer store 11, which is assigned to in each case one line-like storage module 12. A fully automatic storage and retrieval unit 13 operating in the storage module 12 transports the containers 10 from the intermediate buffer store 11 either into the warehouse 9 or directly to the loading installation 14 for transfer to or from trucks and railroad vehicles.

Figure 2:
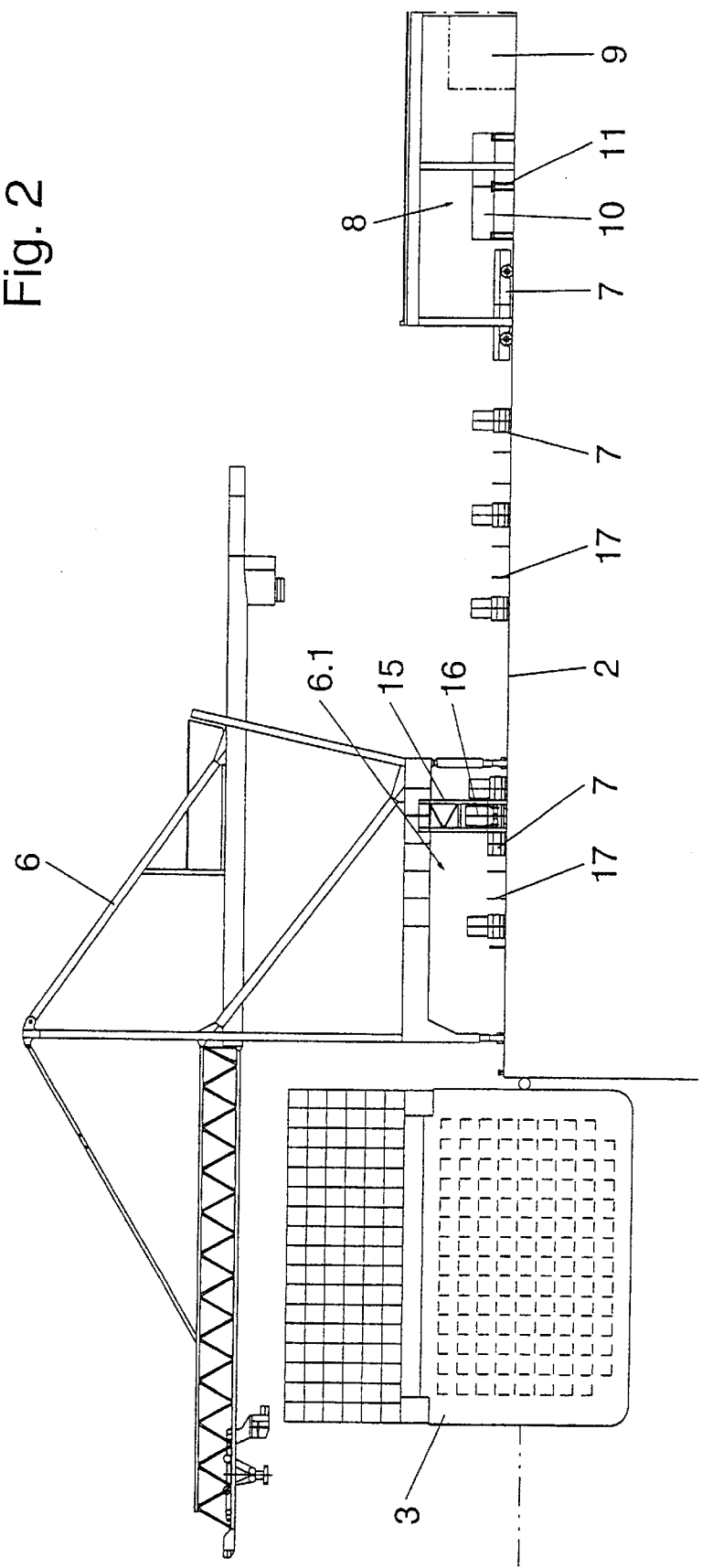
FIG. 2 shows a sectional illustration through a quay in the sea-based part of the transfer installation.

According to FIG. 2, a rigid loading framework 15 is suspended within a bridge portal 6.1 of the container bridge 6. The position of the loading framework 15 can be changed and is determined by the assignment of one of the loading lanes 16 of the DTVs 7 for a certain container bridge 6. Once the container 10 has been received from the loading framework 15 by means of lifting equipment 7.1 of the DTV 7, the container 10 is transported, via one of the traveling lanes 17, to the intermediate buffer store 11 of the warehouse 9 and is set down there in the transfer location 8 by the lowering lifting equipment 7.1.

Figure 3:
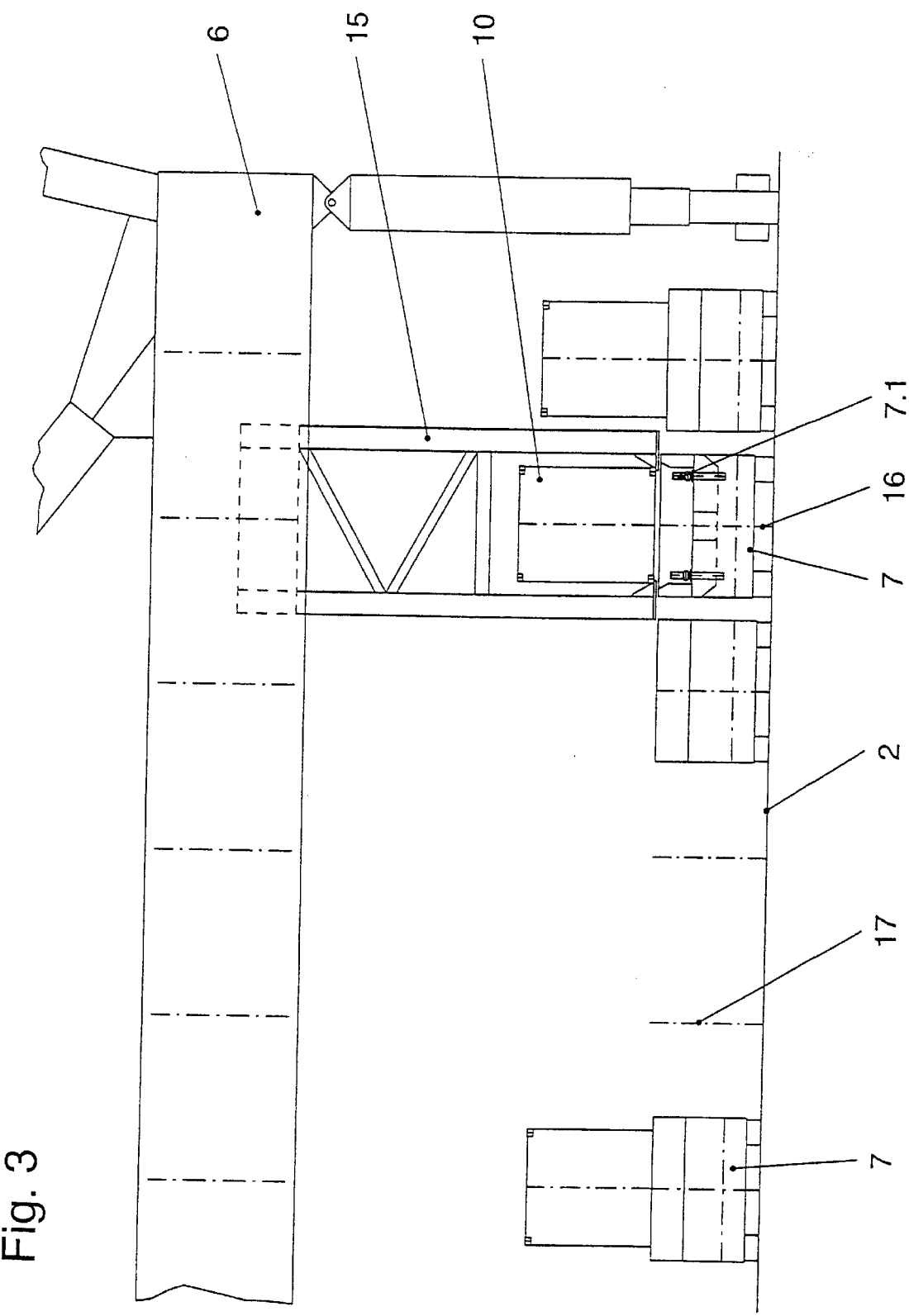
FIG. 3 shows a detail from FIG. 2 in the region of a bridge portal.

In the loading lane 16 of the DTV 7 which is determined specifically for the container bridge 6 according to FIG. 3, the DTV 7 provided with lifting equipment 7.1 receives the container 10 from the loading framework 15. The loading framework 15 is dimensioned geometrically such that it does not adversely affect the loading profile of the DTVs 7 traveling past on the traveling lanes 17.

Figure 4:
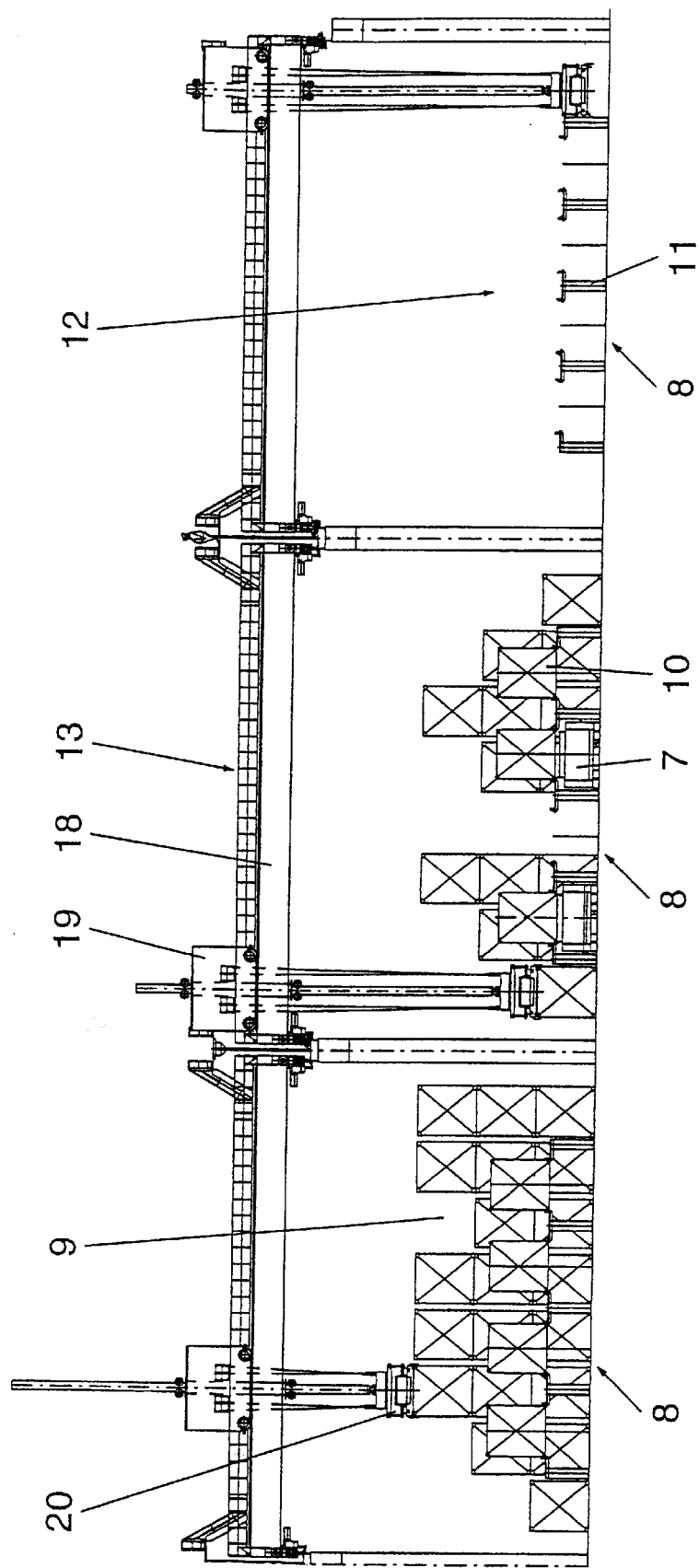
FIG. 4 shows a side view of the warehouse from the quay.

The three transfer locations 8 illustrated in FIG. 4 each have four-aisle intermediate buffer stores 11 in the warehouse 9. As a result of the rigid intermediate buffer store 11, the DTV 7 is capable of setting down the container 10 in the loading region by way of its lifting equipment 7.1 irrespective of the current availability of the relevant storage and retrieval unit 13 for each storage module 12. Each storage and retrieval unit 13 comprises a bridge 18, a crab 19 and a spreader 20.

Figure 5:
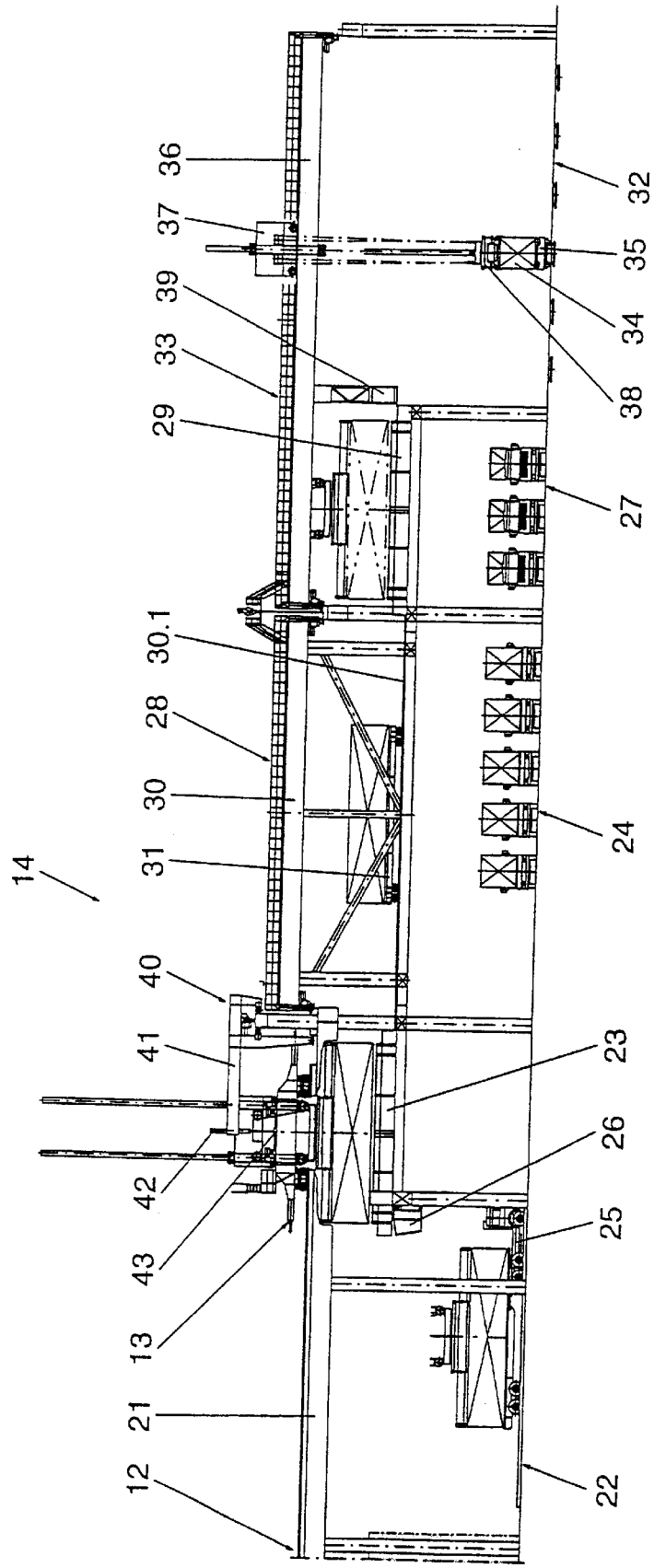
FIG. 5 shows a side view of a loading installation with a loading station for trucks and railroad vehicles.

According to FIG. 5, the storage and retrieval unit 13 is arranged on an elevated crane runway 21 at the land-based end of the storage module 12. A loading station 22 for trucks 25 is located at ground level. A three-aisle first intermediate buffer store 23 assigned to the loading station 22 is arranged on the level directly beneath the crane runway 21. The loading station 22 and the intermediate buffer store 23 are arranged relative to one another such that the safety-critical region above the driver's cab of the truck 25 is not put at risk by collision or falling of the load. Entrance to the loading station 22 is via a five-lane roadway 24. In the loading station 22 assigned to the truck 25, the truck 25 is parked in the rearward direction. A horizontally displaceable checker's cab 26 is suspended beneath the intermediate buffer store 23 and in front of the loading station 22. The displaceability of the checker's cab 26 is ensured by means of a mono-rail system. Depending on the size of the warehouse, a checker or operator operates a number of storage modules 12 parallel to the roadway 24 and monitors, and carries out, the piece-goods transfer. The trucks depart, up to a turning means, via the roadway 24 and, thereafter, via the three-lane roadway 27. Following the intermediate buffer store 23, a transfer transporter 28 in the form of a fully automatic gantry crane, which can move parallel to the first intermediate buffer stores 23, operates as a connecting element to a railroad-based second intermediate buffer store 29. Positioned in the center of the bridge 30 is a satellite carrier vehicle 31, which is provided with drive power from the transfer transporter 28 via a current-carrying cable. The low-level satellite carrier vehicle 31 travels on a railway 30.1 into the intermediate buffer store 23 and receives the container by means of lifting equipment 31.1. Once the satellite carrier vehicle 31 is positioned in the gantry-crane center again, the transfer transporter 28, controlled by a storage and loading control means, travels to a predetermined second intermediate buffer store 29. There, the lifting equipment 31.1 of the satellite carrier vehicle 31 sets down the container in a predetermined storage location. Operating above the railroad-based intermediate buffer store 29 and the associated loading region 32 is a manually operated second loading crane 33 which conveys the container 34 from the storage location of the intermediate buffer store 29 to a rail car 35. The loading 33 comprises a bridge 36, a crab 37 and a spreader 38. A crane cab 39 is positioned such that the crane operator has an optimum view of the rail car 35.

A service vehicle 40 arranged on the loading installation 14 serves for ensuring disruption-free operation in the warehouse 9. The service vehicle 40 is capable, in a very short period of time, of transporting a storage and retrieval unit 13 from one storage module 12 to another storage module 12 of the warehouse 9 or else to a service station integrated in the transfer installation. The service vehicle 40 is arranged and constructed such that the transfer of containers in the region of the loading installation 14 is not obstructed during the operation of transferring a storage and retrieval unit 13. In this exemplary embodiment, the service vehicle 40 is designed as an angled crab with two parallel carrying arms 41 and load-bearing means 42 mounted therein. The storage and retrieval unit 13 has corresponding points of attachment 43 which can be arrested automatically and correspond to the load-bearing means 42.

Figure 6:
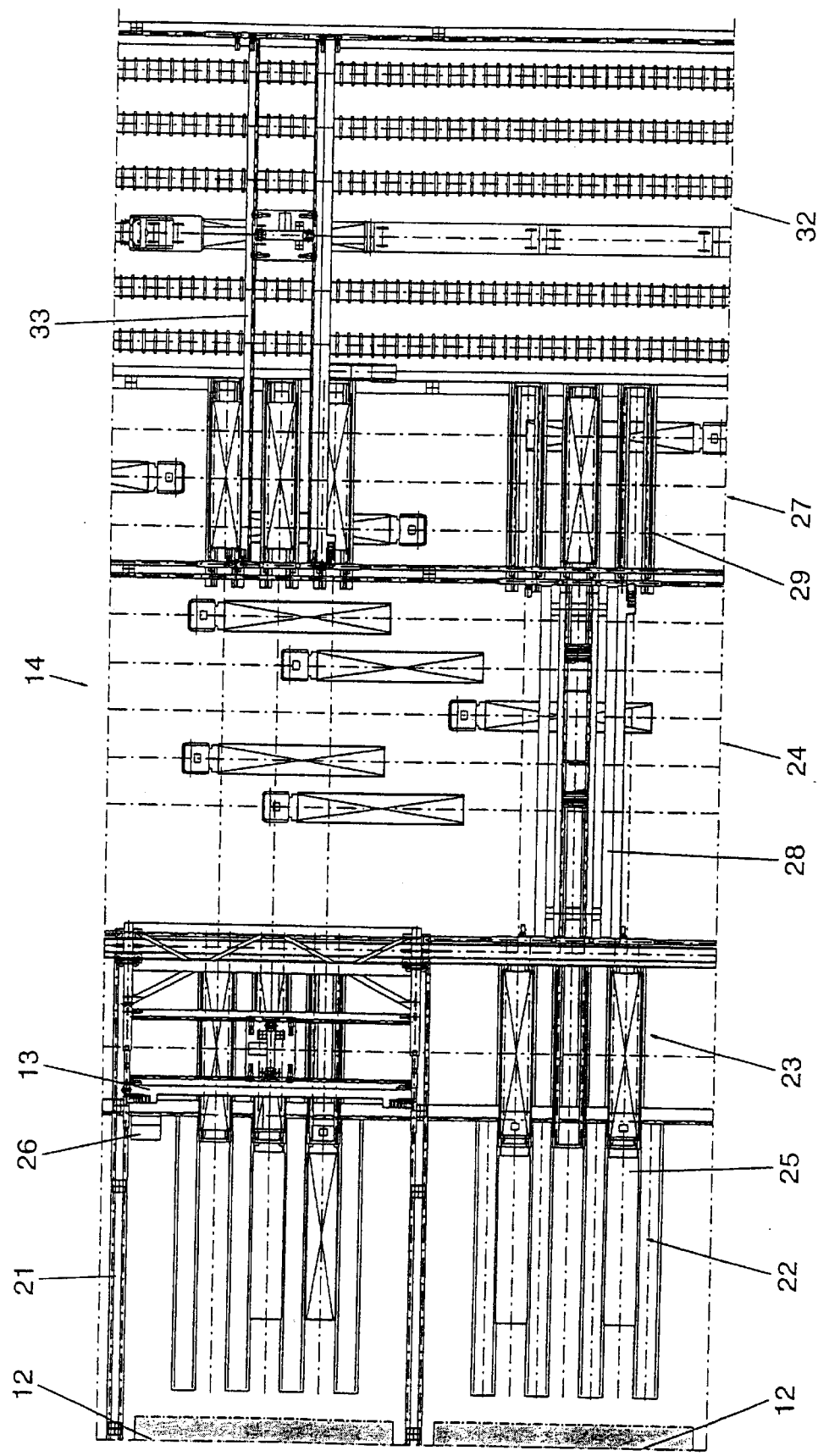
FIG. 6 shows a plan view of a loading installation according to FIG. 5.

For warehouse-based adaptation to a plurality of storage modules 12 according to FIG. 6, the loading installation 14 has a plurality of elevated crane runways 21 which are assigned to the storage modules 12 in each case and on which a storage and retrieval unit 13 assigned to in each case one storage module can be displaced. The loading station 22 for trucks 25 is of three-aisle configuration. Similarly, the intermediate store 23 is designed with three aisles. A five-lane entrance roadway 24 leads to the loading station 22 for trucks 25, and a three-lane departure roadway 27 leads away from the same. The fully automatic transfer transporter 28 in the form of a gantry crane is located above the entrance roadway 24. Above the departure roadway 27 and the railroad-based loading region 32, the manually operated loading crane 33 is illustrated during loading of a rail car.

Figure 7:
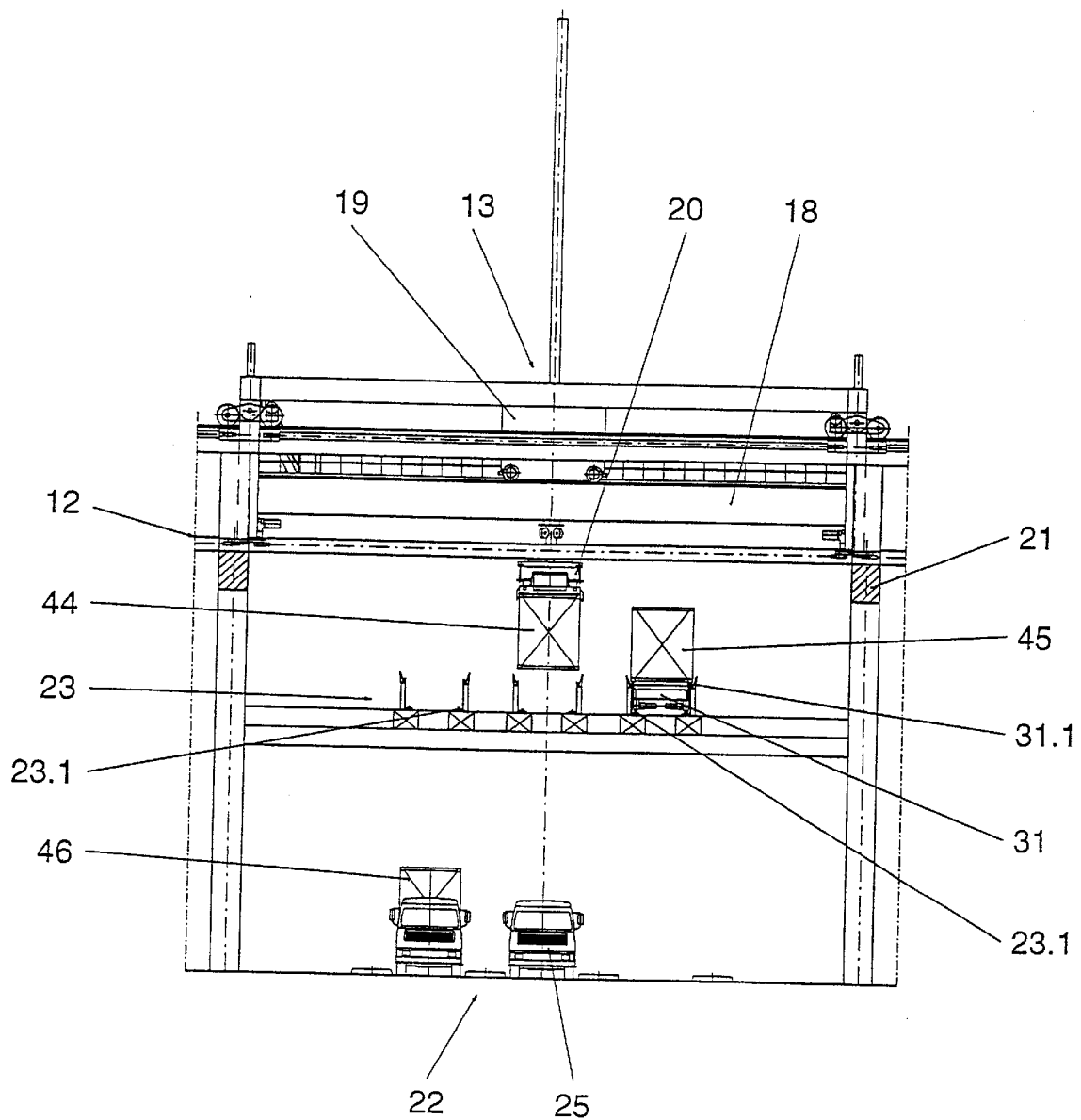
FIG. 7 shows a side view of the warehouse from the loading station.

In the end view of a storage module 12 according to FIG. 7, the bridge-like storage and retrieval unit 13, which is located on the elevated crane runway 21, can be displaced along the storage module 12. Transversely to this, on the bridge 18, the container 44 is transported, by means of the crab 19 and of the spreader 20, to one of the storage locations of the intermediate buffer store 23. The satellite carrier vehicle 31 is arranged displaceably on the railway 23.1 and has the lifting equipment 31.1. The satellite carrier vehicle 31 transports the container 45 transversely to the direction of travel of the crab 19. An associated truck 25 can be loaded/unloaded directly beneath the three storage locations of the intermediate buffer store 23. For this purpose, the loading station 22 has three parking places for trucks 25.

Figure 8:
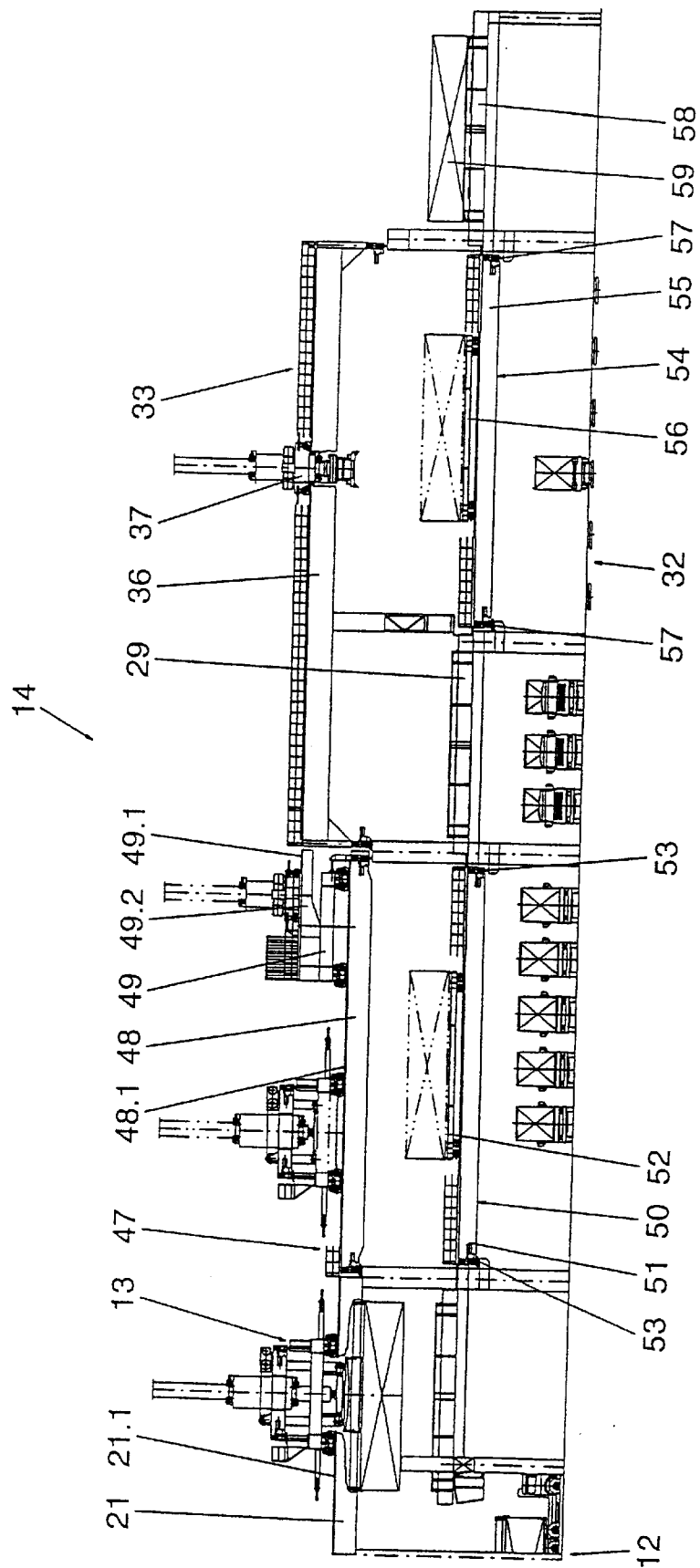
FIG. 8 shows a side view of a second exemplary embodiment of a loading installation for a loading station for trucks and railroad vehicles.

A further embodiment of the loading installation 14 according to FIG. 8 is arranged at the end of the storage module 12 with the storage and retrieval unit 13 operating therein, it being possible for said storage and retrieval unit to be displaced on the elevated crane runway 21. A service vehicle 47 is provided here for transferring storage and retrieval units 13. The service vehicle 47 is analogously capable, within an extremely short period of time, of receiving a storage and retrieval unit 13 from one storage module 12 and transporting it to another storage module 12 or to a service station. The service vehicle 47 is constructed such that the transfer of containers in the region of the loading stations 22 and 32 is not obstructed during the operation of transferring a storage and retrieval unit 13. The service vehicle 47 comprises a bridge 48 and a battery-operated shuttle 49. The batteries are charged in the parking position of the shuttle 49 on the bridge 48. Alternatively, a diesel-electric drive would also be conceivable for the shuttle 49. The railway 48.1 of the bridge 48 is located on the same level as the railway 21.1 of the crane runway 21. It is usually the case—for example for routine maintenance—that the storage and retrieval unit 13 moves independently onto the bridge 48. The arrangement of the crane runways 21 and the independent energy source of the shuttle 49 make it possible for the shuttle 49 to travel into a storage module 12, to be coupled to a storage and retrieval unit 13 and, finally, to draw the latter out as far as the bridge 48. A fully automatic transfer transporter 50, which serves as a connecting element to the railroad-based intermediate buffer store 29, comprises, as a gantry crane, a bridge 51 and the satellite carrier vehicle 52. Apart from a lower-level railway 53, this transfer transporter 50 is constructed, and functions, identically to the transfer transporter 40 in FIG. 5.

An additional fully automatic gantry crane 54 as transfer transporter is provided to follow the railroad-based intermediate buffer store 29, and beneath the loading crane 33. The gantry crane 54 comprises a bridge 55 and the satellite carrier vehicle 56. A railway 57 is arranged on the same level as the railway 53. The gantry crane 54 serves for rapidly transporting containers into and away from the railroad-based loading region 32 and as a connecting element to a further railroad-based intermediate buffer store 58. In this following region, containers 59 in the intermediate buffer store 58 are conventionally transferred by means of reach stackers or straddle carriers. The intermediate store 58 here serves as an interface with a distribution park.

Figure 9:
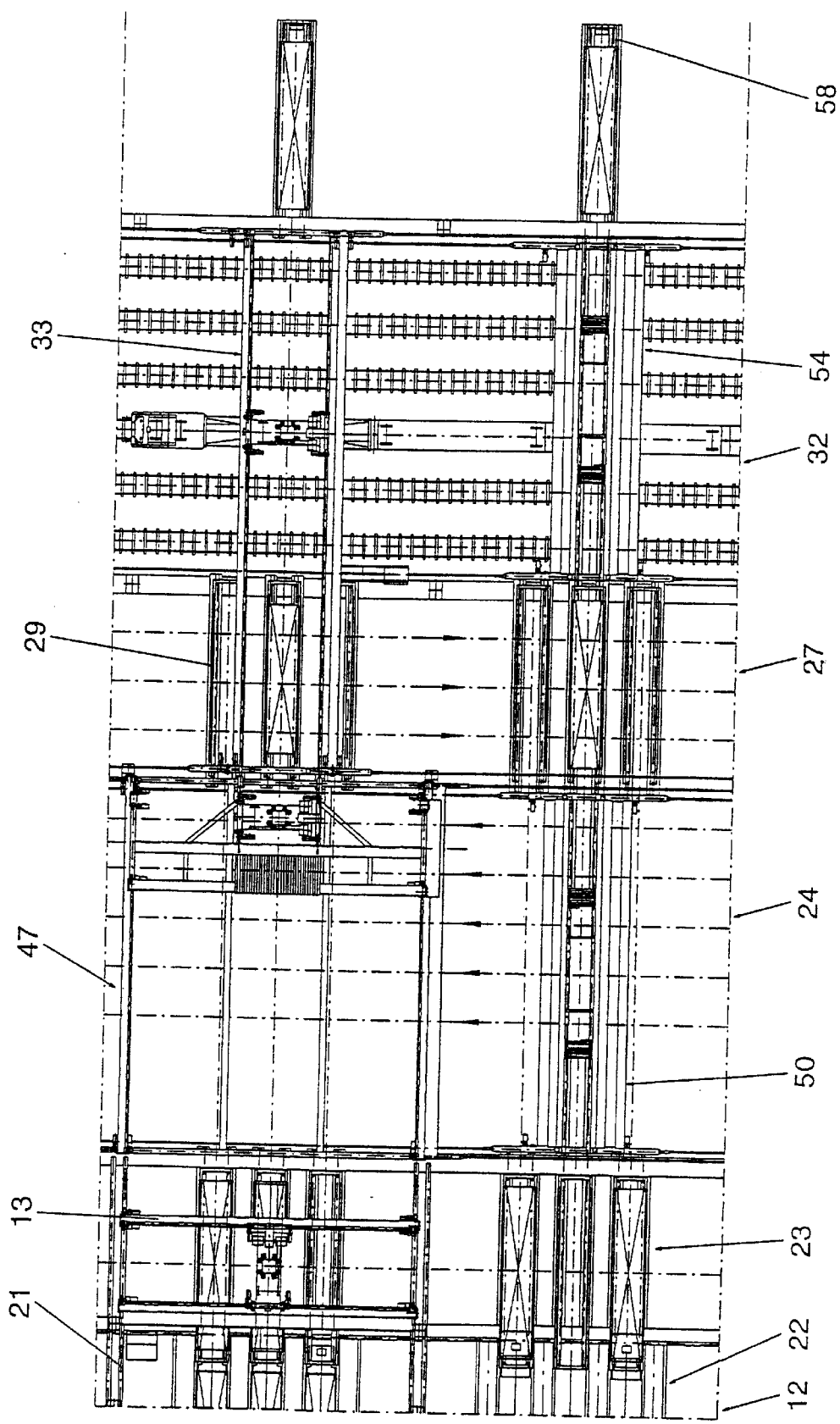
FIG. 9 shows a plan view of the loading installation according to FIG. 8.

The elevated crane runway 21, a storage and retrieval unit 17 and a three-aisle loading station 22 for trucks 25 are provided at the end of two storage modules 12 according to FIG. 9. Furthermore, the intermediate buffer store 23 has three aisles, the entrance roadway 24 has five lanes and the departure roadway 27 has three lanes. The service vehicle 47 and the transfer transporter 50 are illustrated above the entrance roadway 24. The manually operated loading crane 33, the three-aisle intermediate buffer store 29 and the gantry crane 54 are shown above the departure roadway 27 and the railroad-based loading region 32. The free entrance, from three sides, to the preferably single-aisle intermediate buffer store 58 as interface with the distribution park allows conventional container transfer.

What is claimed is:

1. A transfer installation for piece goods, said installation comprising
    a warehouse comprising a plurality of linear storage modules,
    a loading installation which extends transversely of the storage modules, said loading installation comprising two ground-level loading stations for land-going means of transport, first and second one-story high intermediate buffer stores assigned to respective ground-level loading stations and located on a level above the, loading stations, first and second loading cranes assigned to respective first and second intermediate buffer stores for loading and unloading land-going means of transport, each said first loading crane assigned to a respective said storage module for transporting piece goods from said warehouse to said first intermediate buffer stores, and a transfer transporter connecting the first and second intermediate buffer stores, said transfer transporter being movable parallel to said buffer stores and comprising a satellite carrier vehicle which is movable between said first and second buffer stores.

2. A transfer installation as in claim 1 wherein said first intermediate buffer stores serve as an interface to said warehouse, each said first loading crane being able to bypass said first intermediate buffer stores and serve the respective ground level loading stations.

3. A transfer installation as in claim 1 wherein said transfer transporter comprises a fully automatic gantry crane.

4. A transfer installation as in claim 1 further comprising a service vehicle located on a level above the level of said intermediate buffer stores, said service vehicle being able to transfer one of said first loading cranes to one of a service station or another one of said storage modules.

5. A transfer installation as in claim 4 wherein said service vehicle comprises an angled crab with two parallel extension arms, each arm having a load-bearing end for attached to one of said first loading cranes.

6. A transfer installation as in claim 4 further comprising a railway on which said first loading cranes can be displaced, and a bridge with a railway located on the same level as the railway of the first loading crane, said service vehicle comprising a shuttle which can be displaced on said railway of said bridge and coupled to said loading crane.

7. A transfer installation as in claim 6 wherein said shuttle is powered by one of batteries which can be charged in a parking position on the bridge and a diesel-electric drive.

8. A transfer installation as in claim 1 wherein said first loading crane is configured as a stacker crane.

9. A transfer installation as in claim 1 wherein one of said ground-level loading stations serves trucks and the other of said ground level loading stations serves railway cars.

10. A transfer installation as in claim 9 wherein said intermediate buffer store located above the ground-level loading station for trucks extends above the driver's cab of the truck, so that said driver's cab is located outside of the loading station.

11. A transfer installation as in claim 1 further comprising a checker's cab arranged beneath one of said intermediate buffer stores and facing the respective ground-level loading station for manually executing the loading of a truck at said loading station.

12. A transfer installation as in claim 1 further comprising a checker's cab arranged beneath said one of said intermediate buffer stores and facing the respective ground-level loading station for manually executing the loading of a truck at said loading station, said checker's cab being displaceable transversely of said storage modules in order to ensure an unobstructed view of said first loading crane.

13. A transfer installation as in claim 1 further comprising monitoring cameras located so that transfer operations can be controlled from a remote control center.

14. A transfer installation as in claim 1 wherein said transfer transporter further comprises a railway on the level of said intermediate stores, said satellite carrier vehicle being displaceable on said railway and having lifting equipment for accommodating piece goods, and a gantry crane which moves on a level above the level of said intermediate buffer stores, said gantry crane interacting with said satellite carrier vehicle.

15. A transfer installation as in claim 1 wherein one of said ground-level loading stations serves railway cars, the loading crane assigned to the buffer store for the loading station for the railway cars comprising a bridge and a crab fitted with a spreader.

16. A transfer installation as in claim 15 wherein said transfer transporter comprises a railway connecting said intermediate buffer stores, said installation further comprising a bridge crane on a railway over said ground level loading station which serves railway cars and beneath the loading crane assigned to the respective buffer store, said railway over said ground level loading station which serves railway cars being on the same level as said railway connecting the intermediate buffer stores.

17. A transfer installation as in claim 16 further comprising an additional intermediate buffer store at the end of the railway over said ground level loading station which serves railway cars.

18. A transfer installation as in claim 1 further comprising a container bridge which can be displaced transversely of said storage modules for transferring piece goods from said warehouse to a ship in a quay.

19. A transfer installation as in claim 18 wherein said container bridge comprises a bridge portal and a loading framework suspended within said bridge portal, said installation further comprising a plurality of driverless transport vehicles operating between said loading framework and a transfer location arranged upstream of each said storage module.

20. A transfer installation as in claim 19 wherein said driverless transport vehicles operate along travelling lanes running transversely of the storage modules, and said loading framework can be positioned along said bridge portal for adaptation to said travelling lanes.

21. A transfer installation as in claim 19 wherein each said transfer location comprises an intermediate buffer store having a plurality of storage locations.

22. A transfer installation as in claim 19 wherein each said transfer location comprises a loading platform beneath which the driverless transport vehicle can travel, each driverless transport vehicle comprising lifting equipment for transferring piece goods to and from the platform.

* * * * *